US006912435B2

(12) United States Patent
Pellegrini et al.

(10) Patent No.: US 6,912,435 B2
(45) Date of Patent: Jun. 28, 2005

(54) METHODS AND SYSTEMS FOR CONTROLLING RETICLE-INDUCED ERRORS

(75) Inventors: Joseph Pellegrini, Jamaica Plain, MA (US); David Crow, Maple Grove, MN (US); Etienne Joubert, Melbourne Beach, FL (US)

(73) Assignee: Inficon LT Inc., Cambridge, MA (US)

( * ) Notice: Subject to any disclaimer, the term of this patent is extended or adjusted under 35 U.S.C. 154(b) by 0 days.

(21) Appl. No.: 10/229,575

(22) Filed: Aug. 28, 2002

(65) Prior Publication Data

US 2004/0044431 A1 Mar. 4, 2004

(51) Int. Cl.$^7$ .................. G06F 19/00; G01B 11/00
(52) U.S. Cl. .................. 700/121; 700/110; 702/82; 702/84; 356/401
(58) Field of Search ............... 438/7, 14, 16; 716/4; 702/82, 83, 84; 700/95, 110, 116, 117, 121; 356/399, 400, 401; 250/548

(56) References Cited

U.S. PATENT DOCUMENTS

| | | | |
|---|---|---|---|
| 4,054,386 A | 10/1977 | Suzuki | 356/153 |
| 4,550,374 A | 10/1985 | Meshman et al. | 346/490 |
| 4,659,227 A | 4/1987 | Sato et al. | 356/401 |
| 4,703,434 A | 10/1987 | Brunner | 364/490 |
| 4,725,737 A | 2/1988 | Nakata et al. | 250/548 |
| 4,768,883 A | 9/1988 | Waldo et al. | 356/399 |
| 4,776,698 A | 10/1988 | Crosdale | 356/345 |
| 4,780,617 A | 10/1988 | Umatate et al. | 250/548 |
| 4,984,890 A | 1/1991 | Tojo et al. | 356/356 |
| 5,087,537 A | 2/1992 | Conway et al. | 430/15 |
| 5,120,134 A | 6/1992 | Kosugi | 356/401 |
| 5,120,974 A | 6/1992 | Muraki | 250/548 |
| 5,132,195 A | 7/1992 | Pool | 430/22 |
| 5,136,413 A | 8/1992 | MacDonald et al. | 359/213 |
| 5,142,156 A | 8/1992 | Ozawa et al. | 250/548 |
| 5,160,848 A | 11/1992 | Saitoh et al. | 250/548 |
| 5,166,754 A | 11/1992 | Suzuki et al. | 356/401 |
| 5,172,190 A | 12/1992 | Kaiser | 356/401 |
| 5,214,493 A | 5/1993 | Sugiyama et al. | 356/401 |
| 5,444,538 A | * 8/1995 | Pellegrini | 356/401 |
| 5,877,845 A | * 3/1999 | Makinouchi | 355/53 |
| 6,180,289 B1 | * 1/2001 | Hirayanagi | 430/5 |
| 6,248,485 B1 | 6/2001 | Cuthbert | 430/30 |
| 6,304,999 B1 | * 10/2001 | Toprac et al. | 716/4 |
| 6,359,688 B2 | * 3/2002 | Akimoto et al. | 356/401 |
| 6,404,481 B1 | 6/2002 | Feldman et al. | 355/52 |
| 6,416,908 B1 | 7/2002 | Klosner et al. | 430/5 |
| 6,429,930 B1 | 8/2002 | Littau | 356/124 |
| 6,440,619 B1 | 8/2002 | Feldman | 430/30 |
| 6,442,496 B1 | * 8/2002 | Pasadyn et al. | 702/83 |
| 6,460,002 B1 | * 10/2002 | Bone et al. | 702/81 |
| 6,509,201 B1 | * 1/2003 | Wright | 438/16 |
| 6,526,164 B1 | 2/2003 | Mansfield et al. | 382/144 |
| 6,700,950 B1 | 3/2004 | Pellegrini et al. | 378/34 |
| 2002/0085287 A1 | 7/2002 | Boettiger et al. | 359/888 |
| 2003/0138706 A1 | 7/2003 | Progler et al. | 430/5 |

FOREIGN PATENT DOCUMENTS

| | | | | |
|---|---|---|---|---|
| JP | 58176934 A | 10/1983 | | H01L/21/30 |
| WO | WO 00/72090 A | 11/2000 | | |
| WO | WO 01/84382 A | 11/2001 | | G06F/17/50 |

* cited by examiner

*Primary Examiner*—Leo Picard
*Assistant Examiner*—Douglas S. Lee
(74) *Attorney, Agent, or Firm*—Kevin A. Oliver; Foley Hoag LLP

(57) ABSTRACT

Systems and methods for controlling at least one reticle-induced error in a process system, the systems and methods including adjusting measurement data associated with the process system, where the adjustment can be based on at least one reticle identifier (ID) associated with the measurement data, and reticle-induced error data associated with the at least one reticle ID. The methods and systems also include combining the adjusted measurement data to compute at least one control for the process system.

40 Claims, 4 Drawing Sheets

METHODS AND SYSTEMS FOR CONTROLLING RETICLE-INDUCED ERRORS

BACKGROUND

(1) Field

The disclosed methods and systems relate generally to control techniques, and more particularly to control systems for materials manufacturing processes such as semiconductor manufacturing processes.

(2) Description of Relevant Art

Lithography is a process used in semiconductor manufacturing to transfer a circuit pattern from a photomask or reticle to a semiconductor wafer, or more specifically, to transfer the photomask pattern to a layer of resist that has been deposited on the wafer surface, where the resist is sensitive to irradiation. Different types of lithography can be based on the wavelength of the radiation used to expose the resist. For example, photolithography, otherwise known as optical lithography, uses ultraviolet (UV) radiation and a corresponding UV-sensitive resist. Ion beam lithography uses a resist sensitive to an ion beam, electron beam lithography uses a resist film sensitive to a scanning beam of electrons to deposit energy therein, and X-ray lithography uses a resist sensitive to X-rays.

Photolithography employs a photomask that can be understood to be a quartz plate that is transparent to UV radiation and includes a master copy of an integrated circuit that is often a microscopic integrated circuit. The photomask can be used to block resist exposure to select areas using chrome opaque areas.

A stepper is a resist exposure tool used in many photolithography systems to expose part of the wafer or resist in a given exposure. Systems employing a stepper can require a "step-and-repeat" process to expose the entire wafer as desired. A scanner is another type of resist exposure tool used in photolithography systems to expose part of the wafer or resist in a given exposure. Systems employing a scanner can require a "step-and-scan" process to expose the entire wafer as desired. In the aforementioned systems, overlay can be understood as the superposition of the pattern on the mask to a reference pattern previously created on the wafer surface. Related to overlay is alignment, which can be understood to be including positioning, or aligning, the mask or reticle relative to markers or targets on the wafer, prior to the exposure. Accordingly, to achieve proper exposure, overlay and alignment, among other parameters, must be properly controlled.

As the demand for smaller and more complex circuits increases, there is similarly increased demand for monitoring and hence improving overlay and alignment errors. Contributing to such errors can be the x-alignment of the wafer, the y-alignment of the wafer, the scale error or ratio of desired to actual stage movement in the x and y directions, the rotational error of the wafer, the reticle magnification error, and the reticle rotation error, among others.

SUMMARY

In an embodiment, the disclosed methods and systems can control at least one reticle-induced error in a process system, where the process system can be understood as physically including a reticle, and/or otherwise being influenced by characteristics of a reticle, even in the physical absence of a reticle. The methods include measuring at least one process system error based on at least one output of the process system, computing at least one control for the process system based on the at least one error measurement and at least one previously provided control to the process system, adjusting the at least one control based on the at least one reticle-induced error, and providing the at least one adjusted control to the process system. The at least one reticle-induced error can be based on a reticle that is associated with the process system, where, as provided herein, a reticle can be associated with a process system without necessarily being physically included and/or present in the process system. The at least one previously provided control to the process system can be associated with and/or can include at least one reticle-induced error previously provided to the process system, although the previously provided control may include components that may not be associated with the reticle-induced error(s). The process system can include a lithography system and/or a microlithography system, and the measurement system can include, for example, an overlay measurement and/or metrology system.

The measurement system can provide data associated with the process system, where the data can be associated with, and can be modeled to estimate an x-translation, a y-translation, an x-scaling, a y-scaling, a wafer rotation, a grid non-orthogonality, a reticle magnification, an asymmetric reticle magnification, a reticle rotation, and an asymmetric reticle rotation, among others. The measurement system data can thus provide or otherwise be associated with at least one estimate associated with at least one component of the process system, where the estimates can be based on at least one least squares regression model. Error estimates associated with the process system can be based on the least squares regression model, where the error estimates can further include at least one input bias, a variable gain, and/or a fixed gain.

The process system control can include a control that can be associated with an x-translation, a y-translation, an x-scaling, a y-scaling, a wafer rotation, a non-orthogonality, a reticle magnification, an asymmetric reticle magnification, a reticle rotation, and an asymmetric reticle rotation, among others.

The control can be based on at least one weighted moving average that can be further based on historical data that includes error data associated with the process system and previous control data associated with the process system. Previous control data can be understood to be control data provided to the process system during a time prior to the present time. Historical data can be understood as data associated with a time prior to the present time. The historical data can be associated with at least one process system characteristic that can include a process system identifier, a technology identifier, a routing identifier, a process level identifier, an operation identifier, a device (or part number) identifier, a reticle identifier, an exposure tool identifier, and/or another process system characteristic.

The reticle-induced error data can be associated with at least one of an x-translation error, a y-translation error, an x-scaling error, a y-scaling error, a wafer rotation error, a non-orthogonality error, an asymmetric magnification error, an asymmetry rotation error, a reticle rotation error, a reticle magnification error, a critical dimension (CD) linewidth bias, a dose bias, a reticle density, a mask density, a frame-to-frame alignment, a distance from optical center to frame center, an alignment mark line size, an alignment mark density, and an alignment mark duty cycle. The reticle-induced error data can be associated with at least one of a reticle ID, an exposure tool ID, at least one device ID, and at least one level ID. The reticle-induced error data can thus be provided in a reticle table or database that can be queried based on reticle ID and/or other data associated with the reticle-induced errors.

Also disclosed is a system for controlling at least one reticle-induced error in a process system, where the reticle-induced error can be associated with at least one reticle that may or may not be physically included and/or present in the process system. The system also includes a measurement system to provide measurements associated with at least one process system error, and, a control system to provide at least one control to the process system based on the at least one process system error and a previous control provided to the process system, where the at least one control can be adjusted based on at least one reticle-induced error. The process system can be at least one of a lithography system and a microlithography system, and the measurement system can be an overlay metrology system. Additionally, the process system can be at least one of a lithography, a chemical mechanical polish (CMP), a diffusion, thin film, a metal deposition, an ion implantation, and an etching system, where such systems can physically include a reticle, and/or be affected by reticle characteristics although such process system may not physically include a reticle. Similarly, the measurement system can be at least one of an overlay measurement tool, a critical dimension measurement tool, a thickness measurement tool, and a film reflectivity measurement tool.

The methods and systems also include a method for controlling at least one reticle-induced error in a process system, where the method includes adjusting measurement data associated with the process system, where the adjustment can be based on: at least one reticle identifier (ID) associated with the measurement data and reticle-induced error data associated with the at least one reticle ID. The method also includes combining the adjusted measurement data to compute at least one control for the process system. The combination can be based on a weighted moving average, which can be computed based on historical data for a specified time period.

The disclosed methods can include querying the measurement data, where the query can be based on at least one of a time period, a minimum number of measurement data, a maximum number of measurement data, a process system identifier, a technology identifier, a reticle identifier, a routing identifier, an operation identifier, a process level identifier, an exposure tool identifier, and a device identifier (e.g., part number). The query can include a specified hierarchy for wildcarding terms of the query. Wildcarded terms can further be noted as specifying an exact match, specifying a partial wildcard, and specifying a complete wildcard.

For the methods and systems, reticle-induced error data can be associated with at least one of reticle-induced errors, reticle biases, and reticle offsets.

Other objects and advantages will become apparent hereinafter in view of the specification and drawings.

DESCRIPTION

Figure 1:
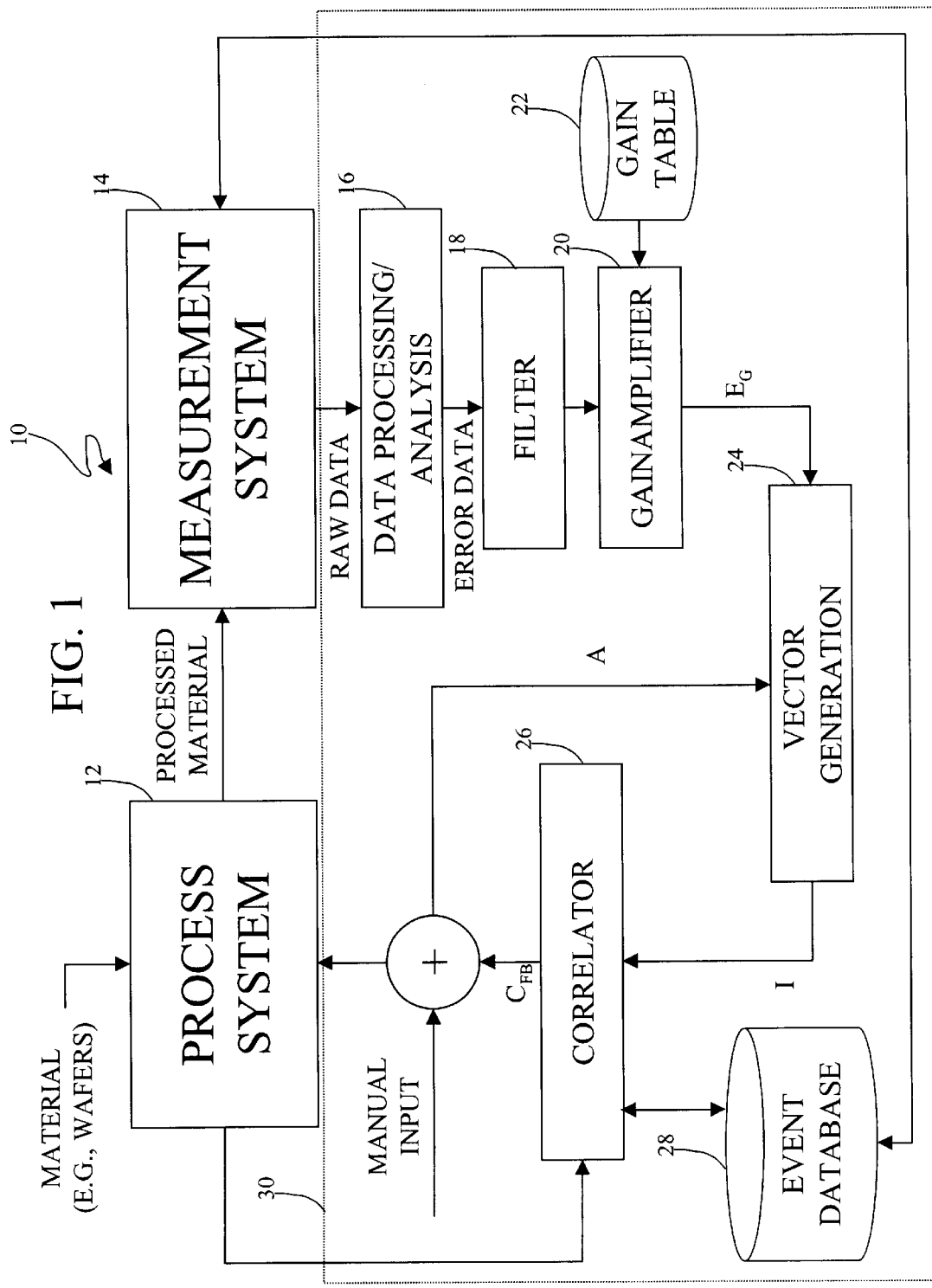
FIG. 1 illustrates a control system using feedback.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed methods and systems can be implemented using one or more processors, where a processor can be understood to include a microprocessor and/or a processor-controlled device that can include, for example, a PC, workstation, handheld, palm, laptop, cellular telephone, or other processor-controlled device that includes instructions for causing the processor to act in accordance with the disclosed methods and systems. References to "a processor" or "the processor" can be understood to include one or more processors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application.

For the disclosed methods and systems, references to a reticle can include a mask and a photomask, and variations thereof. Further, references to a database can be understood to be a memory that can be capable of associating memory elements.

References herein to a controlling a reticle-induced error(s) in a process system can be understood to include controlling errors in a process system that may physically employ or otherwise include a reticle, and/or process systems that may be affected by reticle characteristics (e.g., errors), regardless of whether a reticle is employed or actually physically included in the process system. The disclosed process systems can thus be understood to be associated with at least one reticle, where the such reticle(s) can be further associated with at least one reticle error. Accordingly, references herein to "the process system reticle," etc., can be understood to be the one or more reticles whose errors can affect the process system, regardless of whether the reticle(s) may be physically present in the process system.

FIG. 1 provides one illustrative depiction of a system 10 that includes a process system that can be affected by reticle-induced errors, in an embodiment that can be associated with semiconductor manufacturing. In accordance with FIG. 1, materials such as semiconductor wafers can be input to a process system 12 and hence to a measurement system 14. The illustrated process system 12 can be, for example, a system that performs lithography, chemical mechanical polish (CMP), diffusion, thin film, metal deposition, ion implantation, etching, or another process system. The illustrated measurement system 14 can be, for example, a metrology system such as an overlay measurement system or tool, a critical dimension measurement tool, a thickness measurement tool, a film reflectivity measurement tool, or another measurement tool or system. Accordingly, for one such embodiment based on FIG. 1, semiconductor wafers can be presented to a photolithography system 12 and thereafter to an overlay measurement tool 14 that provides measurements based on the processed wafers.

As shown in FIG. 1, raw data from the measurement system 14 can be provided for processing and/or analysis 16, where the raw data can include measurements from the measurement system 14, configuration data (e.g., component identifiers, system identifiers, etc.) based on the process system 12 and/or the measurement system 14, and other data (e.g., date, time, etc.). For a system according to FIG. 1, a data processing/analysis module 16 can be based on the process system 12 such that the output of the data processing/analysis module 16 can be configured to provide data in a form that can be used by and/or is otherwise compatible with the process system 12. In some systems, for example, the data processing/analysis module 16 can include modules for modeling and/or otherwise estimating at least some components and/or processes of the process system 12. In an illustrative embodiment where the process system 12 can be a lithography system and the measurement system 14 can be an overlay measurement system, the data processing/analysis module 16 can include, for example, least square regression models for components of the lithography system 12. Those with ordinary skill in the art will recognize that such models and/or estimation modules are not limited to least square regression models, and other estimation and/or modeling techniques can be used without departing from the scope of the disclosed methods and systems.

In the illustrated embodiments, the data processing/analysis module 16 can provide error signals and/or data as output. Accordingly, in an embodiment based on the aforementioned lithography system, the data processing/analysis module 16 can provide error data that can include errors based on, for example, x-translation, y-translation, x-scaling, y-scaling, wafer rotation, grid non-orthogonality, reticle magnification, reticle rotation, and/or others, where those of ordinary skill in the art will recognize that such error signals are merely for illustration and not limitation, and some embodiments may include fewer and/or more error data, where the error data can be in either analog and/or digital form. Unless otherwise provided herein, the data throughout the disclosed embodiments and the disclosed methods and systems can be understood to be in either digital or analog form without departing from the scope of the disclosed methods and systems.

Although the data processing/analysis module 16 is not limited to providing error data as output, for the discussion herein, such module's output can be referred to collectively as error data, where such error data can also include data based on the configuration of the process system 12 and/or the measurement system 14, and/or other data. To facilitate an understanding of systems and methods according to FIG. 1, the error data can be understood to include an error vector that can have at least one row and at least one column, where the size of the error vector can be based on the process system 12 and/or the measurement system 14.

Systems and methods according to FIG. 1 can also include a filter 18 that can operate on data based on the data processing/analysis output, and filter such data based on fixed and/or variable criteria. A system administrator, user, or another can establish or otherwise provide the filter criteria. In one illustrative system, the filter 18 can be based on user-defined rules that can qualify the filter input data to determine whether such filter input data should be employed for controlling and/or otherwise characterizing the process system 12. The filter 18 may be viewed as providing a condition for utilizing the input data to characterize the process system 12. For example, the filter 18 can distinguish data based on a number of successfully measured raw data points provided by the measurement system 14, where the number can be user-specified in some embodiments. In one embodiment, if a specified number of successfully measured raw data points are not provided, the data can be distinguished as inappropriate for feedback to the process system 12 in accordance with a system based on FIG. 1. Additionally and/or optionally, the filter 18 can route or otherwise distinguish or classify data based on data markers, flags, or other data that can indicate that the data input to the filter 18 can be ignored or may otherwise be inappropriate for feedback to the process system 12. In one example, the error data can be marked or otherwise designated as being associated with a special event. In some embodiments, the filter 18 can include validation rules that can be applied to the data input to the filter 18. In illustrative systems, the filter 18 can include statistical and/or other filtering techniques that can include, for example, classification techniques such as Bayesian classifiers and neural networks.

Systems and methods according to FIG. 1 can also include a gain amplifier 20 that can be a variable gain amplifier. A gain table 22 can accordingly provide stored gain values that adjust data based on the filtered error vector to compensate for scaling, sign differences, and other process system 12 and/or measurement system 14 characteristics. A gain amplifier output, Eg, can be provided to a vector generation module 24 that can provide a difference between: (a) data representing actual control data (offsets, commands, etc.), A, provided to the process system 12; and, (b) the gain amplifier output, Eg. The difference vector I=A−Eg, can be understood to represent an actual control to the process system 12, less the errors generated by such control. Those of ordinary skill in the art will recognize that the delay in providing the actual control, A, and receiving the error vectors, Eg, can be on the order of seconds, minutes, hours, or days.

Data based on the difference vector I can be provided to a correlator module 26 that identifies and processes data from events having similar process system 12 characteristics. For example, for a given process system 12, events having similar characteristics can include events that are processed using similar configurations of the process system 12 and/or measurement system 14. In an embodiment where the process system 12 can be a lithography system and the measurement system 14 can be an overlay measurement system, for example, characteristics can include a lithography system identifier, a reticle identifier, a routing identifier (e.g., material used in processing), an operation identifier (e.g., operation being performed), a process level identifier (e.g., stage of processing), an exposure tool identifier, and/or a part number, although such examples are provided for illustration and not limitation, and fewer and/or more system characteristics can be used to characterize an event. An event database 28 or other memory component can thus include historical measurement data that can be provided by the measurement process 14 and thereafter be accessed by or otherwise integrated with the correlator module 26 to allow a feedback control and/or command vector, $C_{FB}$, to be computed based on a historical evaluation of similar process system 12 and/or measurement system 14 configurations. In some embodiments, $C_{FB}$ can provide incremental control/commands to the process system 12, while in some embodiments, $C_{FB}$ can provide an absolute control/command to the process system 12. Those of ordinary skill in the art will recognize that in the illustrated embodiment, the dimension of $C_{FB}$ can be based on or be the same as Eg, as the commands provided by $C_{FB}$ can be associated with the process system components for which error data can be obtained.

In some embodiments, event database data can be associated and/or correlated to facilitate queries of the event database 28. In the illustrated system, the event database 28 can associate actual command data, A, and gain amplifier outputs, Eg, with "correlation keys" that represent process system characteristics, and can otherwise be understood to be query and/or index terms. Accordingly, as shown in FIG. 1, the correlator module 26 can provide a command vector, $C_{FB}$, to the process system 12, where $C_{FB}$ can be based on a query of the event database 28 and associated I vector data that can be based on the query. The event database query can otherwise be understood to be a "feedback request," and as provided herein, can be based on correlation keys or process system characteristics.

One of ordinary skill will recognize that although not explicitly indicated in the illustrated embodiments, the event database 28 can include actual command data A, and gain amplifier outputs Eg that may otherwise be understood as errors. Accordingly, an ideal vector, or difference vector, I, can be recreated from respective A and Eg data.

In one embodiment, the command vector, $C_{FB}$, can be based on a weighted moving average of historical difference vectors (e.g., "I vectors") that can be further based on similar process system characteristics and included in the event database 28. The weighted moving average can also be based on a user-specified time-period that can specify a time over which the I vector data can be collected for incorporation into, for example, a weighted moving average. The weighted moving average can be based on fixed and/or variable weights that can be specified by a user, for example. As provided previously herein, in some embodiments, the command vector can be of the same dimension as the gain amplifier output, Eg, and can include similar vector elements. For example, in accordance with a process system 12 that includes a lithography system or tool, a command vector may include at least one control associated with at least one of an x-translation error, a y-translation error, an x-scaling error, a y-scaling error, a wafer rotation error, a non-orthogonality error, an asymmetric magnification error, an asymmetry rotation error, a reticle rotation error, a reticle magnification error, a critical dimension (CD) linewidth bias, a dose bias, a reticle density, a mask density, a frame-to-frame alignment, a distance from optical center to frame center, an alignment mark line size, an alignment mark density, and an alignment mark duty cycle, although such examples are provided for illustration and not limitation.

The illustrated event database 28 can employ a commercially available database (e.g, SQL, Informix, Oracle, Access, etc.) or another system for associating data and allowing such associated data to be queried and/or retrieved according to the methods and systems disclosed herein. In an embodiment where the process system 12 includes a lithography system, the event database 28 can be arranged to associate data based on, for example, process system characteristics and/or other correlation keys that can include a technology identifier (e.g., type of processor, operating system, etc.), a reticle identifier, a route identifier, an operation identifier, a process level identifier, an exposure tool identifier, and/or a part number, although such examples are merely illustrative, and some embodiments can use fewer and/or more identifiers or process system characteristics.

The correlator module 26 can thus also include or otherwise provide for rules for querying the event database 28. In an embodiment, a user and/or system administrator can provide default query rules that can be modified using, for example, an interface such as a graphical user interface (GUI). For example, a user may provide the correlator module 26 with a hierarchy of query criteria and filter criteria such that one or more correlation keys or query criteria can be eliminated from the query or otherwise presented as a wildcard in the query if the filtered query results are not sufficient. Accordingly, query results can be filtered based on default and/or user-specified criteria that can include, for example, a minimum number of query results, a maximum number of query results, a time period within which the data may have been collected, and/or a type of weighting average to apply. In an embodiment, if the filtered query results are inadequate to allow for a computation of the control/command vector, $C_{FB}$, the disclosed methods and systems can allow for a wildcarding of system parameters based on a user's hierarchical wildcarding configuration. Such a system can thus perform several feedback requests or database queries and filterings before obtaining query results sufficient for computing $C_{FB}$.

In one example, a user may query the event database 28 based on process system characteristics that include a technology identifier (ID), a routing identifier (ID), a process level identifier (ID), an operation identifier (ID), a device (or part number) identifier (ID), a reticle identifier (ID), an exposure tool identifier (ID), and/or another process system characteristic. The query may further specify or it may otherwise be known that data satisfying such process system characteristics must be within a time period in the last M weeks, and further, at least N data points must be collected for a valid retrieval. Because the criteria for N data points within the past M weeks may not be satisfied in an initial query, the user may decide to wildcard, for example, the exposure tool ID criteria to potentially allow further data points (i.e., satisfying the query regarding process system characteristics other than exposure tool ID). If N data points with M weeks are not retrieved after querying without employing exposure tool If), the user may specify that the next process system criteria to be eliminated from the query may be reticle ID. Those of ordinary skill in the art will recognize this example as providing an illustration of the aforementioned hierarchical wildcarding, where query terms and/or correlation keys can be specified as employing an exact match (e.g., Windows 2000 operating system), a partial wildcard (e.g., a Windows operating system), or a complete wildcard (e.g., operating system not relevant). As provided herein, the user can additionally and optionally establish a hierarchical rule for invoking the wildcards (e.g., in the example herein, exposure tool ID was ranked as the first parameter to wildcard, followed by reticle ID, etc.).

In some cases, the wildcarding process may not provide sufficient query results for allowing a computation of $C_{FB}$.

In an embodiment, a user or another can be alerted or otherwise informed when $C_{FB}$ cannot be computed because of insufficient query results, and such condition may require a manual adjustment to a system according to FIG. 1.

As illustrated in FIG. 1, some embodiments can allow a user or another to provide a manual input (e.g., user-specified input) to override or otherwise compensate the command vector, $C_{FB}$. Accordingly, a system based on the illustrated control system 30 can include one or more processor-controlled devices that can interface to the process system 12 and the measurement system 14, where a user, system administrator, or another, referred to throughout herein collectively as a user, can access data at various stages of the control system 30 via a user interface (e.g., GUI, operating system prompt) and utilize one or more peripheral devices (e.g., memory, keyboard, stylus, speaker/voice, touchpad, etc.) to provide input or otherwise alter data at various stages of the control system 30. A user can also utilize tools that can be incorporated into or otherwise interface with the control system 30 to analyze or otherwise view data at various stages of the control system 30, where such analysis can be performed in real-time and/or off-line. Accordingly, changes to the components of such a control system 30 can be performed in real-time and/or off-line.

Those of ordinary skill in the art will recognize that in an example where the FIG. 1 process system 12 can be a lithographic system and the measurement system 14 can be an overlay measurement tool, the lithographic system 12 can be configured by a user to query for data from the correlator module 26 and/or event database 28 to provide an initial command vector, $C_{FB}$, where such query can also include or otherwise be based on process system characteristics, hierarchical rules, wildcarding, and/or other criteria. Based on the filtered query results, a $C_{FB}$ can be provided for an initial wafer. If a $C_{FB}$ cannot be computed based on a lack of filtered query results, systems and methods according to FIG. 1 may cause a "send-ahead" wafer to allow processing and measurements upon which control can be provided. Using send-ahead wafers and other such techniques can be costly and can adversely affect the throughput of the methods and systems. As provided herein, to reduce the occurrences of ineffective queries and hence "send-ahead" wafers, users may devise a query that wildcards enough process system characteristics to obtain a desired number of query results to provide an initial $C_{FB}$, but such wildcarding techniques can cause incompatible data (e.g., based on different process system characteristics from that presently occurring in the process system 12) to be included in the $C_{FB}$ computation, and hence be ineffective in providing the desired control. For example, a user can wildcard reticle ID, thus allowing the query to combine (e.g., compute a weighted moving average) based on different reticle IDs. In this example, because different reticles have different reticle errors, such errors remain uncompensated, and hence can combine in undesirable manners to induce undesirable system performance, particularly when the process system 12 is presently utilizing or otherwise affected by a specific reticle.

Figure 2:
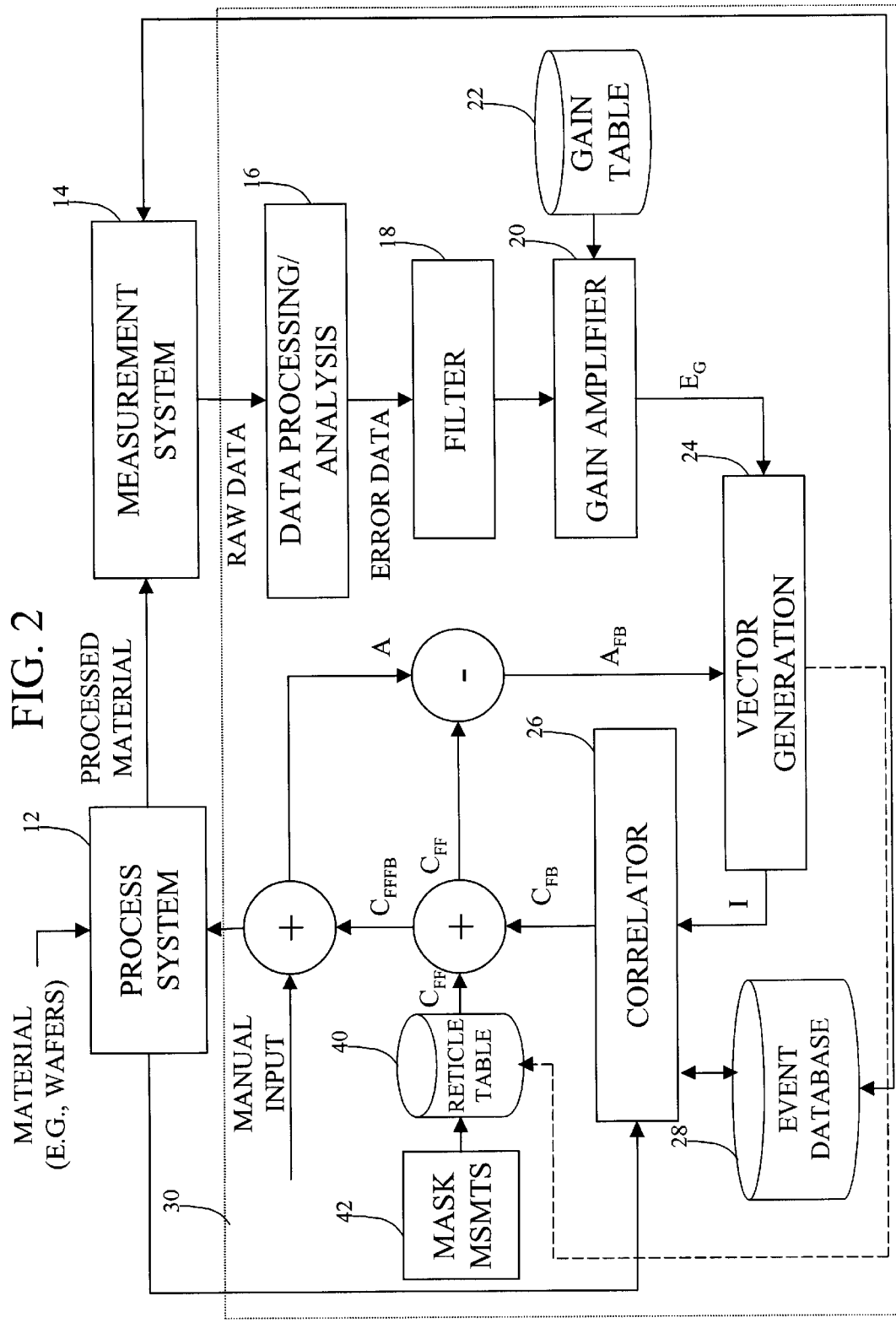
FIG. 2 is an exemplary control system having feedforward and feedback.

FIG. 2 presents one illustrative system and method that can be based on FIG. 1 and provides additional control for systems and methods according to FIG. 1, where the process system 12 can be a system that can be affected by reticle-induced errors and/or includes a reticle, such as, for example, a lithography and/or photolithography system. Systems and methods according to FIG. 2 can be based on a consideration that photomask or reticle-induced errors can be considered static relative to other process system 12 errors that may be considered dynamic. Accordingly, systems and methods according to FIG. 2 may allow a user to query the event database 28 based on hierarchical rules, wildcarding, etc., as provided previously herein with respect to FIG. 1; however, when such query expands to collect data based on a complete and/or partial wildcard of reticle ID, such that a $C_{FB}$ may be based on data from more than one reticle ID, a system according to FIG. 2 can compensate such data by utilizing a reticle table 40 that can include reticle-induced error data based on reticle ID. As provided herein, the relative static nature of reticle-induced errors compared to other process system characteristics facilitates a compensation as provided in FIG. 2. Systems and methods according to FIG. 2 include a feedforward loop based on the reticle table 40 that allows reticle-induced errors to be deconvolved from dynamic errors of the process system 12 and/or measurement system 14.

Those of ordinary skill in the art will thus recognize that when reticle ID is included as a correlation key (e.g., , query item), system configurations that occur infrequently ("short-runners") may provide inadequate query results, and hence cause a manual input to occur. Alternately, if the reticle ID is eliminated from the query (e.g., wildcarded), the combinations of frequent reticle changes in the process system 12 can cause a command/control vector $C_{FB}$ that can cause uncontrolled disturbances (i.e., disturbances at frequencies greater than the process stream operating frequency) in the process system 12.

The FIG. 2 reticle table 40 can be a memory that associates at least one reticle ID to at least one reticle-induced error, reticle-induced bias, and/or reticle-induced offset, where the term "reticle-induced error" can be understood herein to include a reticle-induced bias, reticle-induced offset, or reticle-induced error, as such terms are known in the art, and where the association can be based on a process system 12 and/or a component of a process system 12. In one embodiment shown in FIG. 2, the reticle table 40 can accept reticle (e.g., photomask) error data from manually and/or automatically entered photomask measurements 42, for example, that can be provided via an interface associated with the control system 30. Such data may be provided from a reticle manufacturer, for example, or from another test, manufacturing, and/or data collection facility. In an embodiment, the reticle table 40 can be updated automatically with data from a system according to FIG. 2 system, as those of ordinary skill in the art will recognize that some components of, for example, $E_g$ and/or I, may be associated with reticle-induced errors, and hence such data may be input to the reticle table 40 for updating reticle-induced errors.

Those of ordinary skill in the art will recognize that the reticle table 40 can also include additional data associations to enhance the data provided by the reticle table 40. Accordingly, processor instructions associated with the control system 30 can cause a query of the reticle table 40 where the query can also be specified by a user to allow hierarchical query terms, wildcard terms, etc., and accordingly, the reticle table can associate reticle-induced errors with, for example, layer IDs, device IDs, route IDs, operation IDs, and/or other process system 12 and/or measurement system 14 characteristics.

In one illustrative embodiment of a reticle table 40, for example, queries can be based on one or more reticle parameters that can include reticle ID, exposure tool ID, device ID, and layer ID. Generally, a reticle table 40 may associate these reticle parameters with one or more reticle-induced errors. As provided herein, those of ordinary skill in the art will recognize that "reticle-induced errors" can include errors in a process system that includes a reticle, can generally be associated with a reticle characteristic, and reticle-induced errors can be based on errors associated with reticle manufacture and/or errors associated with the interaction (e.g., alignment, loading) of a reticle with the process system 12 (e.g., exposure tool). For example, reticle-induced errors can include one or more of an x-translation error, a y-translation error, an x-scaling error, a y-scaling error, a wafer rotation error, a non-orthogonality error, a reticle magnification error, an asymmetric magnification error, a reticle rotation error, an asymmetry rotation error, a critical dimension (CD) linewidth bias, a dose bias, a reticle density, a mask density, a frame-to-frame alignment, a distance from optical center to frame center, an alignment mark line size, an alignment mark density, and an alignment mark duty cycle. Those of ordinary skill will recognize that some of the aforementioned reticle-induced errors may be duplicative depending upon a given definition of an error, and accordingly, such errors are not intended for limitation but for illustration of some reticle-induced errors that can be associated with reticle characteristics and/or biases that can be associated with reticles in a process system 12. Some embodiments may employ one or more of these errors and the number of errors associated with a reticle ID can vary based on system characteristics (e.g., process system 12), reticle ID, and other factors.

As FIG. 2 indicates, the feed-forward correction, $C_{FF}$, can be, for example, based on one or more reticle-induced error values (e.g., vector) from the reticle table 40 and can compensate or otherwise factor into the $C_{FFFB}$ that is computed as provided herein and described relative to FIG. 1, and thereafter employed as a basis for feedback and/or control to the process system 12. According to FIG. 2, such feed-forward correction, $C_{FF}$, can also be removed and/or decoupled from the actual command or offset data to allow the I vector, referenced in FIGS. 1 and 2, to be unaffected by the feed-forward correction.

The disclosed methods and systems can thus compute a control command for the process system 12 based upon historical event database data, and compensate such control based on reticle-induced errors when such historical data may be completely associated with the process system's reticle (e.g., query provides sufficient data associated with the query-specified reticle ID), partially associated with the process system's reticle (e.g., query provides data from multiple reticles that include the query-specified reticle ID), and/or completely unassociated with the process system's reticle (e.g., query provides data from one or more reticles, none of which include the query-specified reticle ID).

Figure 3:
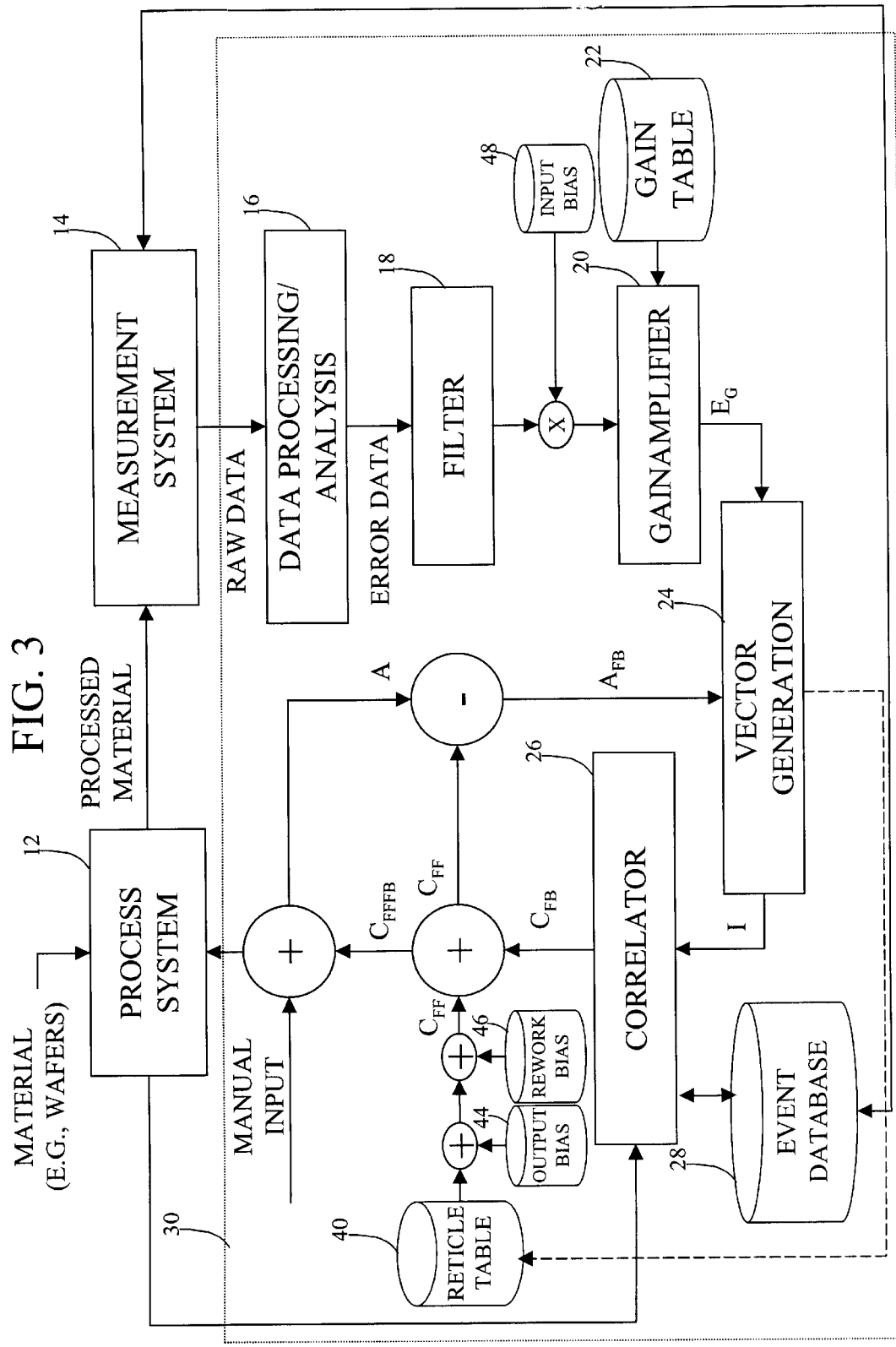
FIG. 3 presents another control system having feedforward and feedback.

Those of ordinary skill also recognize that the methods and systems exemplified by the illustrations, including FIGS. 1, 2, and 3, are intended to facilitate an understanding of the disclosed methods and systems, and thus, can be altered without affecting the scope of the disclosed methods and systems. For example, results from a query of the event database 28 can cause a query of the reticle table 40 such that reticle-induced errors can be extracted and a command vector computed based on a weighted moving average of the event database data that can be adjusted based on the reticle table data. Accordingly, the reticle table 40 may be considered to be accessed by or otherwise included in the illustrated correlator module 26, and it can be understood that one or more databases can be employed to store at least A vectors, $E_g$ vectors, and reticle-induced errors.

Further, those with ordinary skill will recognize other variations of the disclosed methods and systems. For example, in one embodiment, the process system 12 may provide process system data directly to the event database 12 (e.g., "A" vector data). Similarly, the measurement system 14 may also provide data directly to the event database 12. In an embodiment, an entry of measurement system data to the event database 12 can cause a computation of an error vector $E_g$ as provided in the illustrated systems, where upon completion of the $E_g$ computation, $E_g$ can be associated with process system data (e.g., "A" vector data) in the event database 12. As provided herein, I data can thereafter be determined from the associated A vector data and $E_g$ vector data. In some embodiments, such A and/or $E_g$ data can also be associated with reticle-induced error data to facilitate the computation of $C_{FFFB}$ as provided herein. Accordingly, and as provided herein, in some embodiments, the reticle table 40 can be incorporated, integrated, and/or otherwise associated with the event database 28.

FIG. 3 provides an illustrative embodiment based on the disclosed methods and systems that includes additional and/or optional features, elements, and/or components that can be used in systems and methods according to FIGS. 1 and/or 2. FIG. 3 includes an input bias 48, an output bias 44, and a rework bias 46 that can be individually and/or optionally incorporated with the disclosed methods and systems without departing from the scope thereof. The input bias 48 can be referred to as a set point bias and can control the process system 12 to regulate to a non-zero value. In a photolithography embodiment, an input bias 48 could compensate for a known etch process bias, for example.

The FIG. 3 output bias 44 can also be known as a feed-forward bias, and in a lithography process system 12 that includes an exposure tool, can represent a bias to compensate a bias produced by a known characteristic of the material entering the process system 12, where the process system 12 can be, for example, an exposure tool. In an illustrative system, if the mean thickness of the nitride layer for a particular group of wafers has been measured, a bias can be provided to compensate for the thickness difference.

As provided herein, FIG. 3 also includes a rework bias 46 that can be a bias to compensate for a known quality of material entering the process system 12 that produces a known bias based on rework. As indicated previously herein, the input 48, output 44, and/or rework 42 biases can be additionally and/or optionally included in the methods and systems according to FIGS. 1 and 2, and references to such systems can be understood to optionally include such biases.

Four case studies demonstrate the performance of systems and methods according to FIGS. 1–3. Three of the cases employed a system based on FIG. 1. Case Study 1 included a specific set of correlation or query keys (i.e., feedback request or query data) for a long-running part (e.g., representing a single reticle ID with relatively abundant event data within the specified time period). Case Study 2 utilized the same set of correlation keys as Case Study 1, but for multiple short running parts (e.g., relatively small amount of event data for several reticle IDs). One of ordinary skill would anticipate that Case Study 2 would cause a relatively high number of feedback responses indicating that there was insufficient historical data (i.e., query results) available to forecast the feedback command, $C_{FB}$. Accordingly, Case Study 3 omitted the reticle ID as a correlation or query key to effectively combine the long-runner and short-runners into the same mixed stream of data (e.g., combine data from multiple reticle IDs). For Case Study 3, it was expected that the effectiveness of a system and method according to FIG. 1 would be negated by frequent reticle changes. Accordingly, Case Study 4 utilized the same scenario as Case Study 3 (i.e., same correlation keys, mixed data stream of short-runners and long-runners), but employed a system and method according to FIGS. 2 and 3 that addresses reticle changes as a priori disturbance knowledge and allows compensation and/or control via a feed-forward path demonstrated through the illustrative systems and methods of FIGS. 2 and 3. Table 1 presents a Summary of the Case Study scenarios.

Case study results were based on processing the case study data sets using a simulator that was also based on the methods and systems of FIGS. 1–3. The simulator configuration settings are described in Table 2.

TABLE 1

EXPERIMENTAL DESCRIPTION

| Case Study | Product Mix | Correlation Keys | System and Method according to: |
|---|---|---|---|
| 1 | Long Runner | Exposure Tool ID, Layer, Part Number | FIG. 1 |
| 2 | Short Runner | Exposure Tool ID, Layer, Part Number | FIG. 1 |
| 3 | Mixed Stream | Exposure ID, Layer | FIG. 1 |
| 4 | Mixed Stream | Exposure ID, Layer | FIGS. 2 and 3 |

TABLE 2

SIMULATOR CONFIGURATION

| Control Parameter | Configuration |
|---|---|
| Rolling time window for valid historical data | 14 days |
| Minimum historical events required to forecast feedback | 1 |
| Maximum historical events used when forecasting feedback | 10 |
| Weighted moving average applied to the historical events | Equally weighted |

For the simulation, reticle biases, errors, or offsets were computed using an average Ideal Correction (e.g., I vector) based on historical long-term data for a reticle. The reticle offset was applied to an experimental data set as follows:

$$\text{Ideal Correction} = \text{Actual Correction} - \text{Modeled Error} \quad (1)$$

Case Study 1 and 2 were compared using two metrics: The first metric, overlay improvement, represents the enhancement of a system according to FIG. 1 over an extremely precise human feedback loop; and, the overlay improvement metric can be defined as the difference of an average overlay of all exposure events under manual control, and an average overlay of all exposure events as predicted by the simulation tool. A positive value indicates that the simulation tool predicted an improvement over the manual method:

$$\text{Overlay Improvement} = \text{Average}(\text{Manual Control}) - \text{Average}(\text{Simulation}) \quad (2)$$

The second metric is known as Insufficient Data Response, and can be defined as the number of feedback responses (i.e., query results) indicating insufficient historical data to forecast the feedback command, $C_{FB}$. This metric is represented by "n out of m (%)" requests for feedback resulting in insufficient data responses.

A Result Summary providing the two metrics is provided in Table 3. As Table 3 indicates, for Case Study 1, and as expected, an automated system according to FIG. 1 provides improvement over manual control when applied to a long-runner and a highly specific set of correlation keys. Results show an improvement of about 13 nm and 7 nm in the x and y directions respectively. Because of the abundant historical data available, only the first feedback request resulted in an insufficient data response.

With reference to Case Study 2 results, when a short-runner product mix utilizing the same set of highly specific correlation keys was applied to a system according to FIG. 1, no discernable overlay improvement was noted. Although the automated control can be more beneficial than a highly intense human feedback loop, 41 of 157 feedback requests resulted in an insufficient data response, and accordingly, twenty-six percent of the exposure events may require human intervention to determine if send ahead wafers are needed or if default process conditions should be used. In either case, the insufficient data response can consume costly equipment time and resources.

Referring to Table 3 and Case Study 3 that omits the part number from the correlation keys, the number of insufficient data responses was reduced from 41 in Case Study 2, to only one that corresponded to the first feedback request; however, frequent and thus uncompensated reticle changes of the mixed historical data stream negatively impacted overlay performance. The Table 3 results indicate an impact of about 6 nm and 7 nm in the x and y directions, respectively.

Case Study 4 results provided in Table 3 can be based on a system according to FIGS. 2 and 3 that deconvolves the reticle component from the dynamic process and tool drifts. By treating the reticle-induced error (offset, bias, etc.) as a feedforward disturbance (see FIGS. 2 and 3), both metrics are improved. Table 3 indicates an overlay improvement of about 6 nm and 3 nm in the x and y directions respectively, with only the first feedback request resulting in an insufficient data response.

TABLE 3

RESULTS SUMMARY

| Case Study | Based on: | Overlay Improvement | Insufficient Data Response |
|---|---|---|---|
| 1 | FIG. 1 | X: +12.7 nm Y: +6.9 nm | 1 of 68 (1.5%) |
| 2 | FIG. 1 | X: +0.4 nm Y: +0.2 nm | 41 of 157 (26.0%) |
| 3 | FIG. 1 | X: −6.4 nm Y: −6.7 nm | 1 of 225 (0.4%) |
| 4 | FIGS. 2 or 3 | X: +5.8 nm Y: +3.3 nm | 1 of 225 (0.4%) |

Figure 4:
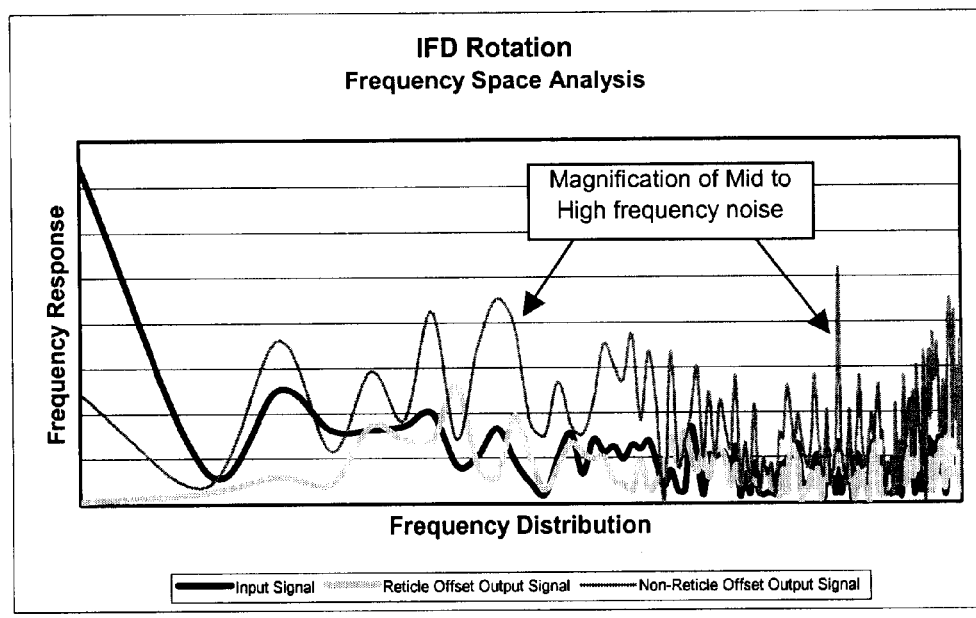
FIG. 4 provides a frequency graph comparing the disclosed systems and methods.

The overlay improvement results for Case Studies 3 and 4 can be further described using a frequency or Fourier analysis of the measured and predicted overlay errors. FIG. 4 displays an input signal that represents the measured overlay error of the manually controlled process, a non-reticle offset output signal that represents the predicted overlay error for a system according to FIG. 1, and a reticle offset output signal that represents the predicted overlay error for a system and method according to FIGS. 2 and 3. The right-hand side of the graph represents middle and high frequency noise that occurs at a rate greater than the sampling rate or plan of the given process stream and therefore may not be controlled using advanced process control (APC). A goal of an APC system can be to attenuate the low frequency, or controllable variations, without magnifying the middle and high frequency noise that can be uncontrollable.

The area under the FIG. 4 input signal curve on the left hand side of FIG. 4 suggests that APC systems, such as those shown in FIGS. 1–3, can provide improvement at these lower frequencies; however, as provided herein, the middle to high frequency regions should not be amplified by the APC systems. Accordingly, in referring to the output signals, the non-reticle offset (e.g., Case Study 3) and reticle offset output signals (e.g, Case Study 4) of FIG. 4 indicate an attenuation of the lower frequencies when compared to the input signal. FIG. 4 also indicates that the non-reticle offset output amplifies the middle and high frequency noise when compared to the input signal, which can be an undesirable effect as provided previously herein. In contrast, the reticle offset output signal can be comparable to the input signal at the middle and higher frequencies, while providing attenuation at the lower frequencies.

What has thus been described are systems and methods for controlling at least one reticle-induced error in a process system, the systems and methods including adjusting measurement data associated with the process system, where the adjustment can be based on at least one reticle identifier (ID) associated with the measurement data, and reticle-induced error data associated with the at least one reticle ID. The methods and systems also include combining the adjusted measurement data to compute at least one control for the process system.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, compact disk (CD), DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

The processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, or another device capable of being integrated with a processor(s) that can operate as provided herein. Accordingly, the devices provided herein are not exhaustive and are provided for illustration and not limitation.

Although the methods and systems have been described relative to a specific embodiment thereof, they are not so limited. Obviously many modifications and variations may become apparent in light of the above teachings. For example, some embodiments may use pattern density, otherwise known as photomask density, in a feedforward in an etch or CMP process.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for controlling at least one reticle-induced error in a process system, the method comprising:
    measuring at least one process system error based on at least one output of the process system,
    computing at least one control for the process system based on the at least one process system error measurement and at least one previously provided control to the process system,
    adjusting the at least one control based on the at least one reticle-induced error, and providing the at least one adjusted control to the process system.

2. A method according to claim 1, where the at least one reticle-induced error is based on a reticle associated with the process system.

3. A method according to claim 1, where the at least one previously provided control to the process system is associated with at least one reticle-induced error previously provided to the process system.

4. A method according to claim 1, where the process system includes at least one of a lithography system and a microlithography system.

5. A method according to claim 1, where:
    the process system includes at least one of a lithography system and a microlithography system, and,
    measuring at least one process system error includes providing a wafer to an overlay metrology system.

6. A method according to claim 4, where measuring at least one process system error includes providing measurements associated with at least one of: an x-translation, a y-translation, an x-scaling, a y-scaling, a wafer rotation, a non-orthogonality, a reticle magnification, an asymmetric reticle magnification, a reticle rotation, and an asymmetric reticle rotation.

7. A method according to claim 1, where measuring at least one process system error includes providing at least one estimate associated with at least one component of the process system.

8. A method according to claim 1, where measuring at least one process system error includes providing at least one least squares regression model based on at least one component of the process system.

9. A method according to claim 8, where providing at least one least squares regression model includes inputting the at least one measured process system error to a least squares regression model to produce at least one error estimate.

10. A method according to claim 1, where measuring at least one process system error includes estimating at least one of: an x-translation, a y-translation, an x-scaling, a y-scaling, a wafer rotation, a non-orthogonality, a reticle magnification, an asymmetric reticle magnification, a reticle rotation, and an asymmetric reticle rotation.

11. A method according to claim 1, where generating at least one error measurement includes providing at least one input bias.

12. A method according to claim 1, where measuring at least one process system error includes providing at least one of a variable gain and a fixed gain.

13. A method according to claim 1, where computing at least one control for the process system includes computing at least one control associated with at least one of: an x-translation, a y-translation, an x-scaling, a y-scaling, a wafer rotation, a non-orthogonality, a reticle magnification, an asymmetric reticle magnification, a reticle rotation, and an asymmetric reticle rotation.

14. A method according to claim 1, where computing at least one control includes computing at least one weighted moving average.

15. A method according to claim 1, where computing at least one control includes computing at least one weighted moving average based on historical data based on at least one process system characteristic.

16. A method according to claim 1, where computing at least one control includes computing at least one weighted moving average based on at least one of a process system identifier, a technology identifier, a routing identifier, a process level identifier, an operation identifier, a device identifier, a reticle identifier, and an exposure tool identifier.

17. A method according to claim 1, where computing at least one control for the process system based on the at least one error measurement includes computing the at least one control based on historical data associated with the process system, the historical data including error data associated with the process system and previous control data provided to the process system.

18. A method according to claim 1, where adjusting the at least one control based on at least one reticle-induced error includes adjusting the at least one control based on at least one of: an x-translation error, a y-translation error, an x-scaling error, a y-scaling error, a wafer rotation error, a non-orthogonality error, a reticle magnification error, an asymmetric magnification error, a reticle rotation error, an asymmetry rotation error, a critical dimension (CD) linewidth bias, a dose bias, a reticle density, a mask density, a frame-to-frame alignment, a distance from optical center to frame center, an alignment mark line size, an alignment mark density, and an alignment mark duty cycle.

19. A method according to claim 1, where adjusting the at least one control based on at least one reticle-induced error includes adjusting the at least one control based on at least one of an output bias and a rework bias.

20. A method according to claim 1, further including determining that the at least one measurement is inappropriate for providing control to the process system.

21. A method according to claim 1, where adjusting the at least one control based on at least one reticle-induced error includes providing at least one of: at least one manual reticle-induced error and at least one automatic reticle-induced error.

22. A method according to claim 1, further including associating a reticle ID with the at least one reticle-induced error.

23. A method according to claim 22, further including associating at least one of: at least one exposure tool ID, at least one device ID, and at least one level ID with the reticle ID.

24. A method according to claim 1, where adjusting includes querying a reticle table based on a reticle ID, the reticle table associating at least one reticle ID with the at least one reticle-induced error.

25. A method according to claim 1, where providing the adjusted control to the control system includes modifying the adjust control with a manual input.

26. A system for controlling at least one reticle-induced error in a process system, the system comprising:

a measurement system to provide at least one measurement associated with at least one process system error, and, a control system to provide at least one control to the process system based on the at least one process system error and at least one previously provided control to the process system, the at least one control adjusted based on at least one reticle-induced error.

27. A system according to claim 26, where the at least one reticle-induced error is at least one of: associated with at least one reticle physically present in the process system and associated with at least one reticle physically absent from the process system.

28. A system according to claim 26, where the process system is at least one of a lithography system and a microlithography system.

29. A system according to claim 26, where the measurement system is an overlay system.

30. A system according to claim 26, where the process system is at least one of: a lithography, a chemical mechanical polish (CMP), a diffusion, thin film, a metal deposition, an ion implantation, and an etching system.

31. A system according to claim 26, where the measurement system is at least one of: an overlay measurement tool, a critical dimension measurement tool, a thickness measurement tool, and a film reflectivity measurement tool.

32. A system according to claim 26, further including a reticle table for associating at least one reticle identifier with the at least one reticle-induced error.

33. A method for controlling at least one reticle-induced error in a process system, the method comprising:

adjusting measurement data associated wit the process system, where the adjustment is based on: at least one reticle identifier (ID) associated with the measurement data and reticle-induced error data associated with the at least one reticle ID, and, combining the adjusted measurement data to compute at least one control for the process system.

34. A method according to claim 1, where combining includes computing a weighted moving average.

35. A method according to claim 1, where the combining includes computing a weighted moving average based on a specified time period.

36. A method according to claim 33, further including querying for measurement data based on at least one of a time period, a minimum number of measurement data, a maximum number of measurement data, a technology identifier, a routing identifier, a process level identifier, an operation identifier, a device identifier, a reticle identifier, and an exposure tool identifier.

37. A method according to claim 36, where the querying includes specifying a hierarchy for wildcarding terms of the query.

38. A method according to claim 37, where specifying a hierarchy for wildcarding terms of the query includes at least one of: specifying an exact match, specifying a partial wildcard, and specifying a complete wildcard.

39. A method according to claim 33, where the reticle-induced error data is associated with at least one of reticle-induced errors, reticle-induced biases, and reticle-induced offsets.

40. A method according to claim 33, where the reticle-induced error data includes at least one of: an x-translation error, a y-translation error, an x-scaling error, a y-scaling error, a wafer rotation error, a non-orthogonality error, a reticle magnification error, an asymmetric magnification error, a reticle rotation error, an asymmetry rotation error, a critical dimension (CD) linewidth bias, a dose bias, a reticle density, a mask density, a frame-to-frame alignment, a distance from optical center to frame center, an alignment mark line size, an alignment mark density, and an alignment mark duty cycle.

* * * * *